Jan. 23, 1940.   G. K. SMITH   2,188,120
TIRE CHAIN TIGHTENER
Filed June 9, 1938
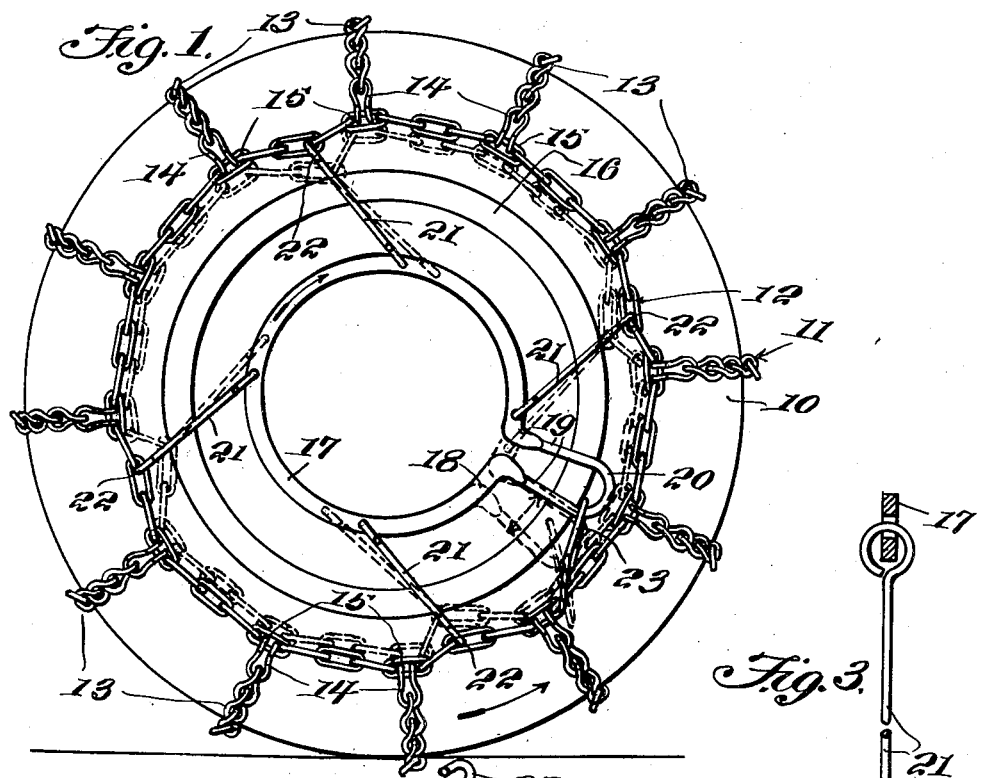
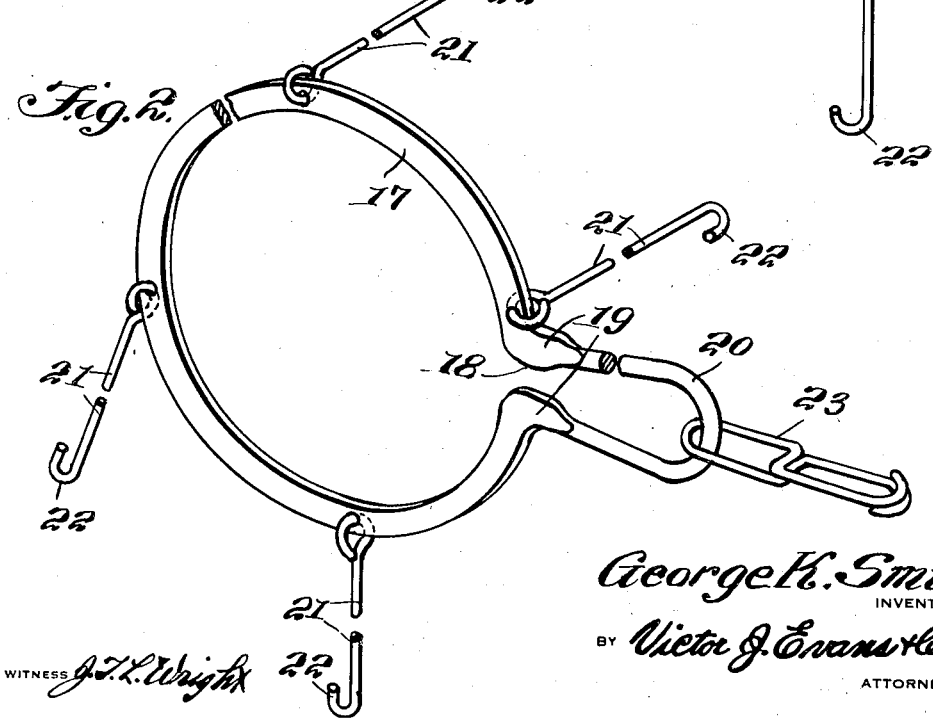
George K. Smith
INVENTOR
BY Victor J. Evans & Co.
ATTORNEYS
WITNESS J. T. L. Wright Patented Jan. 23, 1940

2,188,120

UNITED STATES PATENT OFFICE 2,188,120

TIRE CHAIN TIGHTENER

George K. Smith, Moundsville, W. Va.

Application June 9, 1938, Serial No. 212,810

2 Claims. (Cl. 152—242)

The invention relates to a holder for a tire chain of the anti-skid type and more especially to a tire chain tightener.

The primary object of the invention is the provision of a device of this character, wherein the same is engageable with a tire chain at the outside of a wheel when the said chain is worn thereby and operates to hold the chain tight about the wheel for the purpose of preventing skidding and also to assure a gripping tread in the rotation of the wheel.

Another object of the invention is the provision of a device of this character, wherein the tire chain can be readily fastened on a wheel without necessitating the jacking up of such wheel and when upon the latter will be maintained secure and tight regardless of the speed of travel of the wheel, the device being of novel construction in its entirety.

A further object of the invention is the provision of a device of this character wherein the same when engaged with a tire chain will hold it tight and this condition will exist during the travel of the vehicle wheel, being easy of application and also assures the convenient removal of the tire chain from the wheel when required.

A still further object of the invention is the provision of a device of this character, which is extremely simple in its construction, thoroughly reliable and efficient in operation, possessed of maximum strength and durability and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a side elevation of a vehicle wheel showing the same securing a tire chain with the device constructed in accordance with the invention applied.

Figure 2 is a perspective view of the device removed from the chain and wheel.

Figure 3 is a fragmentary sectional view showing in fragmentary elevation one of the attaching hook links of the device.

Similar reference characters indicate corresponding parts throughout the several views in the drawing.

Referring to the drawing in detail, there is shown applied to the tire 10 an antiskid chain 11 including side chains, of which one side chain 12 only is shown, and which side chains are connected at suitable intervals by cross members 13 extending transversely over the periphery of the tire in the usual manner, these cross members being usually in the form of short chains having end members 14 hooked into suitably spaced links 15 of the side chains.

For the application of these tire chains to a tire, it is required that they be of a length to provide a certain amount of slack or looseness in order to get them over the tire 10. It is necessary that this slack or looseness be taken up after the chain is on the tire as otherwise on high speeds of travel of the vehicle wheel, being generally indicated at 16, the cross chains 13 are thrown out away from the tire by centrifugal action and as the wheel rotates these chains then hit the pavement with a hard blow soon pounding the chains to pieces. On breakage of these chains 13, the same cause damage to the fenders of a vehicle of the motor type. It is essential to have the chain 11, when applied to a tire 10 during motion of the wheel 16, snugly fitted about the tire for obtaining the best results in avoiding skidding when a vehicle is driven.

The present invention, which is a tire chain tightener or holder, comprises a ring-like member 17 flattened at opposite sides thereof and split at 18 while the ends 19 of said member next to the split 18 have integrally formed therewith a loop 20 which is radially disposed to said member 17 while loosely connected at intervals to the member 17, preferably uniformly spaced from each other, are elongated stem hooks 21, the bills of the same being indicated at 22, so that they can be readily attachable to selected links 15 of the side chain 12.

The loop 20 has loosely fitted therewith an opening and closing link 23, being of elongated substantially 8-shape, and this link 23 is adapted for separable fastening to the side chain 12 between the cross members 13 thereof at a selected point of such tire chain.

In the use of the device, the hooks 21 are engaged with selected links 15 of the side chain 12 when the tire chain has been applied about the tire 10 and also the link 23 is engaged with the side chain 12 at a selected point thereof between the cross members 13 of such tire chain. When it is desired to tighten the tire chain it is necessary to rotate the member 17 in a direction to have the elongated stem hooks 21 disposed tangentially to said ring which causes the tightening of the cross chains 13 which bridge the thread of the tire 10 and at the same time distorting the outermost side chain 12 and thence the closing link 23 is engaged with a link of the said outermost side chain to hold the member 17 in the position shown by full and dotted lines in Figure 1 of the drawing. In this manner the said tire chain will be made tight and sustained in such condition. In this fashion the cross members 13 will have maximum life and damage to the fenders resultant from breakage of these members 13 will be avoided. In the application of the tire chain there is no necessity for deflating the tire and the jacking up of the wheel being not necessary either for the putting on or taking off of such tire chain. Furthermore, better traction on snow, ice, sleet or mud will be had through the use of the tightener.

The side chain 12 can be equipped with a separable fastener of any conventional form for the opening up of this chain and the closing thereof at will.

What is claimed is:

1. A tightener for a tire chain including side chains and cross members, comprising a ring-like member disposed to have one of the side chains concentric thereto, stem hooks loosely connected to the ring-like member at determined intervals thereof and separably engageable with the side chain concentrically disposed to said ring-like member, a loop extending outwardly of the said ring-like member with respect to its outer periphery, and a fastener loosely engaged with said loop and separably engageable with the said side chain for maintaining the stem hooks tangentially with respect to the ring-like member and fixedly holding the tire chain in a tightened condition upon a wheel.

2. A tightener for a tire chain including side chains and cross member, comprising a ring-like member disposed to have one of the side chains concentric thereto, stem hooks loosely connected to the ring-like member at determined intervals thereof and separably engageable with the side chain concentrically disposed to said ring-like member, a loop extending outwardly of the said ring-like member with respect to its outer periphery, and a fastener loosely engaged with said loop and separably engageable with the said side chain for maintaining the stem hooks tangentially with respect to the ring-like member and fixedly holding the tire chain in a tightened condition upon a wheel, the said fastener being in the form of an opening and closing link.

GEORGE K. SMITH.